Sept. 6, 1966  H. EHRENREICH ET AL  3,270,562
SOLID STATE HYDROSTATIC PRESSURE GAUGE
Filed Jan. 7, 1964  2 Sheets-Sheet 1
Fig.1.
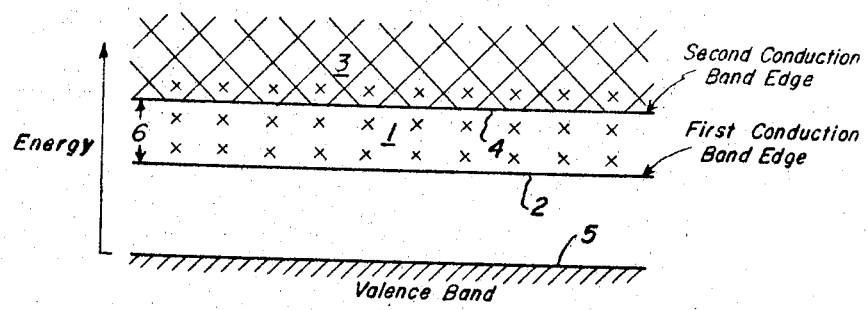
Fig.2.
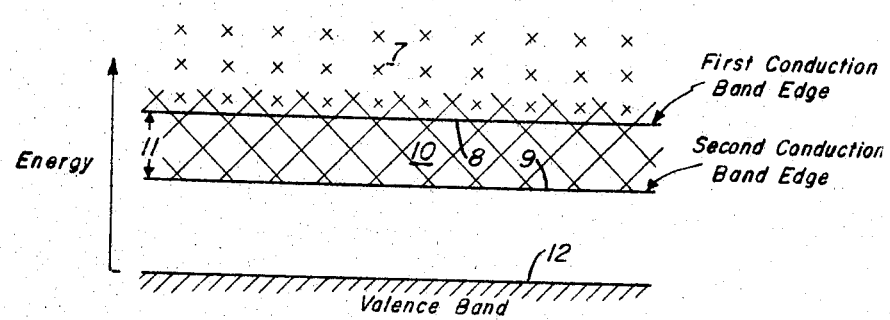
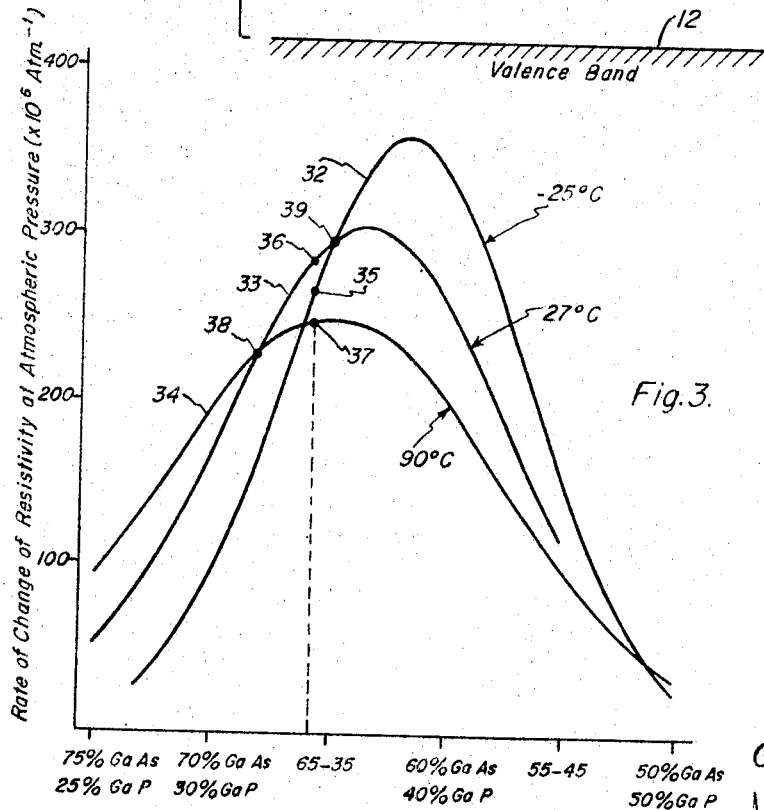
Fig.3.
Inventors:
Henry Ehrenreich;
Gunther E. Fenner,
by
Their Attorney.

Inventors:
Henry Ehrenreich;
Gunther E. Fenner,
by John F. Ahern
Their Attorney.

United States Patent Office 3,270,562
Patented Sept. 6, 1966

3,270,562
SOLID STATE HYDROSTATIC PRESSURE GAUGE
Henry Ehrenreich, Arlington, Mass., and Gunther E. Fenner, Schenectady, N.Y., assignors to General Electric Company, a corporation of New York
Filed Jan. 7, 1964, Ser. No. 336,309
16 Claims. (Cl. 73—398)

The present invention relates generally to apparatus for measuring the magnitude of pressure in liquids and gases, and more particularly pertains to semiconductive materials for this purpose.

It is frequently necessary or highly desirable to measure the magnitude of hydrostatic pressure in a medium. Hydrostatic pressure as used herein pertains to an equilibrium condition wherein the force per unit area on the surfaces of a given body is everywhere equal and independent of orientation or position of surfaces on the body. For example, each external surface of a body disposed adjacent the earth's surface at sea level is subjected to atmospheric hydrostatic pressure having a magnitude of approximately 14.7 pounds per square inch, regardless of body orientation. Similarly, a body submersed in a liquid is subjected to uniform hydrostatic pressure on all exposed sides. Despite forces that give rise to hydrostatic pressure, equilibrium is maintained and a body subjected thereto that is at rest will remain at rest, or if in motion, will move uniformly in a straight line, until acted upon by some other external force. This is the essence of hydrostatic pressure, and it is means for measuring the magnitude of hydrostatic pressure to which the present invention is addressed primarily, though the instant teaching can be applied advantageously to measure ordinary pressure or force.

The piezoresistance effect in semiconductive materials has been exploited for the purpose of measuring the magnitude of pressure. The piezoresistance effect pertains to the change in resistance of a semiconductive crystal body of high crystalline perfection that attends applying a force in a given direction relative to the crystallographic orientation, or axes, of the body. Because the force is directed in a single direction it is known as a uniaxial force and the resulting stress is referred to in the art as uniaxial stress.

In order to measure hydrostatic pressure, uniaxial stress is induced in a semiconductive body with the aid of a mechanical system, such as a diaphragm. Inertia of the mechanical system in such indirect measuring devices increases the response time far beyond the response time of the semiconductive device, which is ordinarily less than one millionth of a second. Though it would be highly desirable to obviate the mechanical system and realize the full potential of semiconductive materials to make extremely rapid measurements of hydrostatic pressure, no direct measurement of hydrostatic pressure has been feasible in the past because the rate of change of resistivity in semiconductive materials directly subjected to variations in hydrostatic pressure is very small in known semiconductive materials such as silicon, germanium and gallium arsenide, throughout the hydrostatic pressure range ordinarily of interest.

An additional obstacle to the use of semiconductive hydrostatic pressure measuring devices is that semiconductive materials undergo variations in the rate of resistance change with hydrostatic pressure deviations as a result of changes in temperature. This is particularly troublesome in applications wherein the temperature of the system may vary considerably and the temperature of the semiconductive element is either unknown or impossible to ascertain by practical means, rendering compensation inexact.

There is a need for hydrostatic pressure measuring means which may be submersed in a medium to effect direct measurement of pressure and to obviate cumbersome mechanical arrangements. Preferably, the hydrostatic pressure measuring means should be relatively insensitive to temperature variations and respond to pressure variations with a large change in resistance. Also, it would be desirable to use semiconductive crystals positioned in a random crystallographic orientation to avoid the many practical problems and attendant expense of obtaining a predetermined orientation. Heretofore, there has been no practical, direct hydrostatic pressure measuring means, much less, such means featuring measurement substantially independent of temperature, and exhibiting large rates of resistance change with variations in hydrostatic pressure. Additionally, there has been heretofore no practical pressure or force measuring means using semiconductive crystals that allow random crystallographic orientation.

Accordingly, it is a primary object of the present invention to provide means for directly measuring hydrostatic pressure.

Another object of this invention is to provide means for directly measuring hydrostatic pressure that is practical and uses semiconductive materials for rapid response.

Another object of this invention is to provide pressure or force measuring means using semiconductive crystals which require no precise crystallographic orientation.

Yet another object of the present invention is to provide means for directly measuring hydrostatic pressure that is relatively insensitive to temperature variations.

Still another object of the present invention is to provide direct hydrostatic pressure measuring means that uses a semiconductive crystal which requires no particular crystallographic orientation, is relatively temperature insensitive and responds to variations in static pressure with large changes in resistance.

Briefly, in one preferred embodiment of our invention, we provide a hydrostatic pressure sensor comprising an alloy of semiconductive compounds. Preferably, the alloy is constituted of two compounds. The constituents are selected to have dissimilar hydrostatic pressure versus resistance characteristics. Either constituent, taken alone, is relatively insensitive to hydrostatic pressure changes. The constituents are proportioned in the alloy depending upon their relative hydrostatic pressure versus resistance characteristics, in accord with this invention, to provide an alloy semiconductive body that responds to hydrostatic pressure variations with large resistance changes. Additionally, dependence of rate of resistance change upon temperature is markedly reduced, with only a slight sacrifice in sensitivity, by slightly varying the proportion of constituents in accord with a further teaching of the present invention. Means for measuring the resistance of the alloy semiconductive body are provided and the resistance value obtained is utilized as an indication of hydrostatic pressure surrounding the body.

The features of our invention that are believed to be novel are set forth with particularity in the appended claims. Our invention, however, both as to its organization and operation, together with further objects and advantages thereof, may best be understood by reference to the following description taken in connection with the accompany drawings in which:

FIGURE 1 is an energy diagram illustrating two conduction bands of a direct electron transition semi-conductive compound suitable for use in accordance with the present invention;

FIGURE 2 is an energy diagram illustrating the conduction bands of an indirect electron transition semiconductive compound suitable for use in accordance with the present invention;

FIGURE 13 is a graph illustrating the effect of temperature variations on the sensitivity of a static pressure gauge constituted of an alloy semiconductive body having various proportions of two constituents that have the characteristics generally set forth in FIGURES 1 and 2, respectively;

Figure 4:
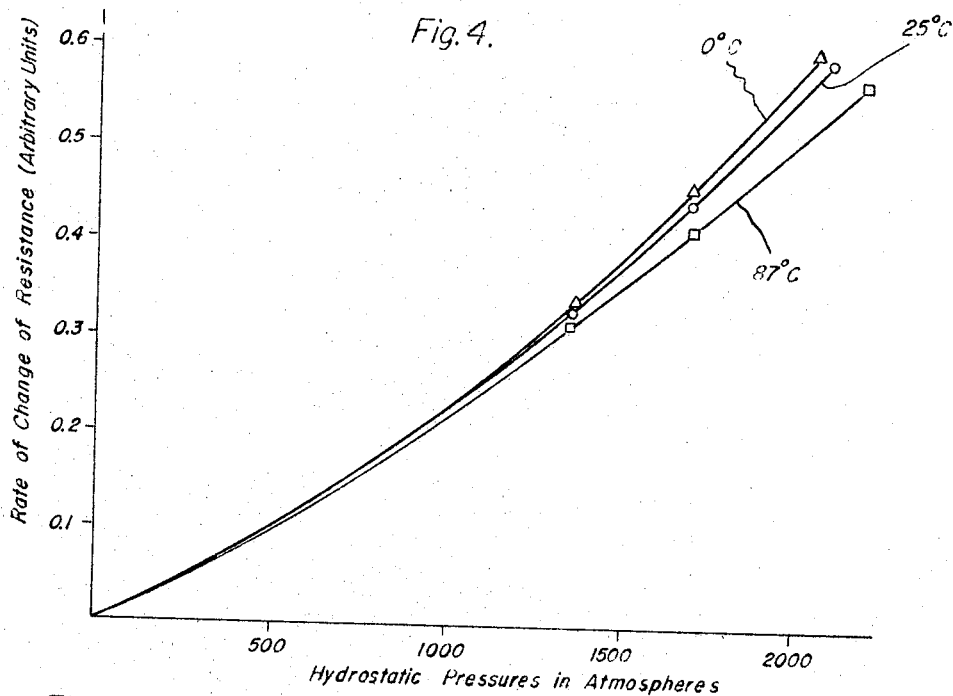
FIGURE 4 is a graph showing temperature compensation achieved by practice of the present invention.

An energy diagram of a crystalline semiconductive material having two conduction bands is illustrated in FIGURE 1. First conduction band 1 is defined by the lower energy band edge 2 and second conduction band 3 is defined by the higher band edge 4. The band edges 2 and 4 represent the minimum energy, with respect to the top edge 5 of the valence band, that an electron must have when present in band 1 or 3, respectively.

Assume that FIGURE 1 represents the band structure when the crystal is not subjected to substantial hydrostatic pressure. As the static pressure is increased, band edge 2, of conduction band 1, increases in magnitude relative to the valence band, and band edge 4 of conduction band 3 remains substantially constant. Accordingly, energy difference 6 is decreased by subjecting the semiconductive body to an increased hydrostatic pressure. At a sufficiently high hydrostatic pressure, energy difference 6 will have decreased to the extent where some of the electrons from band 1 will be found in conduction band 3, reducing the electron population of band 1, because the supply of electrons in any given system is essentially constant.

A semiconductive material of the type discussed in conjunction with FIGURE 1 may be composed in general of a compound semiconductor or an alloy of compound semiconductors from the Group III–V (of the periodic table) class which are denominated Direct Transition Semiconductors (adapted to direct transitions of electrons between valence and the conduction bands) and may include, for example, gallium arsenide, indium antimonide, indium arsenide, indium phosphide and alloys therebetween. For a further discussion of direct transition semiconductor reference is hereby made to an article by H. Ehrenreich in the Journal of Applied Physics, vol. 32, page 2155 (1961). Other suitable direct transition semiconductive materials include lead sulfide, lead selenide and lead telluride.

The semiconductive materials used in accord with the present invention are advantageously selected of types wherein there is a great difference in electron mobility between the two conduction bands. Electron mobility pertains to the relative ease with which electrons may move under the influence of an electric field. When the electron mobility of the two conduction bands differs widely, the resistivity of the body changes significantly as electrons shift from one band to the other. The change in resistivity depends upon the relative number of electrons which make the transition from one band to another as well as the relative mobility ratio between the bands. The semiconductive materials are also advantageously selected to possess bands that accommodate different numbers of electrons (possess different densities of states). It is generally the case, and to be preferred, that the higher mobility band possesses the lower density of states and the lower mobility band possesses the higher density of states.

The principle of operation of the hydrostatic pressure sensors of this invention is based upon the transition of the electrons from one band to another band having different characteristics in response to changes in hydrostatic pressure. The electron transitions are detected by measuring the corresponding change in resistivity of the particular semiconductive compound used. The extent to which given hydrostatic pressure variations cause changes in resistance determines the pressure coefficient of resistivity. This coefficient is equal to the change in resistance divided by the product of resistance and pressure. The coefficient changes with variations in the magnitude of temperature or pressure. It is generally desired that the pressure coefficient of resistivity be maximized to provide increased sensitivity of measurement.

The reduction in energy difference 6 which results from increased pressure is relatively small. Thus, the obstacle to using a semiconductive compound having the characteristics depicted in FIGURE 1, is apparent; no electrons will be shifted from band 1 to band 3 until the semiconductive material has been subjected to a relatively high static pressure. For example, gallium arsenide has a band structure as generally shown in FIGURE 1 and an appreciable number of electron transitions to the second band occurs therein only above approximately 20,000 atmospheres hydrostatic pressure at usual temperatures. In many environments wherein hydrostatic pressure is to be measured, it is desirable that the conduction bands be substantially equal at atmospheric pressure in order to achieve a rapid electron transfer at normal hydrostatic pressures.

FIGURE 2 illustrates an energy level diagram of another type of semiconductive compound that, at atmospheric pressure, contains a first energy band 7 having a band edge 8 which is substantially higher in energy than band edge 9 of its second conduction band 10. The bands are separated by an energy difference 11. A semiconductive material of the type characterized in FIGURE 2 exhibits a relatively constant resistance, that is dependent upon the electron population of band 10, throughout the range of increasing hydrostatic pressure. This is because band edge 8 moves more rapidly upward than band edge 9, with respect to valence band edge 12, under the influence of increasing hydrostatic pressure, yielding an even greater energy difference 11.

As discussed in conjunction with FIGURE 1, a substantial number of electron transitions do not occur until the band edges are substantially equal in energy level. Thus, the semiconductive material characterized by conduction bands as shown in FIGURE 2 does not provide a useful hydrostatic pressure measuring device although it is conceivable that negative pressure, or tension on the external surface, could be applied to effect a reduction in energy difference 11.

Semiconductive materials of the type characterized by band structures such as illustrated in FIGURE 2 are denominated Indirect Transition Semiconductors (not adapted to direct transitions of electrons between valence and conduction bands). This group of materials includes, for example, gallium phosphide, aluminum antimonide, germanium and silicon. A further discussion of indirect transition semiconductors is to be found in the aforementioned article by H. Ehrenreich, that is intended to be incorporated herein by reference thereto. It is to be noted, however, that it is intended for purposes of the present invention to include within the denomination of indirect transition semiconductors those materials having extremely small energy gaps between the two conduction band edges, as gallium antimonide, though such materials are frequently elsewhere denominated direct transition semiconductors. The reason for this is that these borderline semiconductive materials assume the role of indirect semiconductive materials for purposes of practice of the present invention, particularly where substantial temperature compensation is achieved, as will be pointed out more clearly hereinafter.

It will be appreciated by those skilled in the art to which the present invention relates that the term "first conduction band" as used herein denominates a band of higher electron mobility and lower density of states than what is denominated herein by the term "second conduction band." In the direct transition materials the edge of the first conduction band is at a lower energy level than the edge of the second conduction band, whereas the reverse is true for the indirect transition materials. Also, with the exception of the lead salts, the energy difference between band edges increases with increased pressure in the direct transition materials, while the corresponding energy difference decreases with increased pressure in the indirect transition materials.

In accord with the present invention it has been discovered that a particularly desirable alloy semiconductive body for hydrostatic pressure measurement is constituted of a first semiconductive compound, of the type shown in FIGURE 1 (having a substantially higher electron mobility and substantially lower minimum energy level in the first conduction band than in the second conduction band thereof) and a second semiconductive compound, of the type shown in FIGURE 2 (having a first conduction band with a higher electron mobility and higher energy level than the second conduction band thereof). As mentioned above, preferably, the lower mobility bands have a higher density of states than the higher mobility bands. By properly selecting the relative concentrations of the two semiconductive compounds in the semiconductive alloy, the respective conduction bands of the alloy possess substantially equal minimum energy levels, or band edges, and yet a high ratio is maintained between the electron mobilities of the respective conduction bands. With a semiconductive body having substantially equal conduction bands at atmospheric pressure, but possessing a first conduction band that is slightly lower than the second conduction band thereof, the rate of electron transport between the conduction bands is large, resulting in a large change in resistance with variations in hydrostatic pressure and a particularly sensitive element for hydrostatic pressure gauges.

In accord with the instant teaching, the indirect transition semiconductive material is present in the alloy semiconductor body in a proportion by mole percent in the range from 0.65 to 0.85 times the ratio of the energy difference of the direct transition semiconductive material to the summation of this energy difference and the energy difference of the indirect transition semiconductive material selected.

The aforementioned relationship is expressed by the equation:

(1) $$A = \frac{E_D}{E_{ID} + E_D}(X)$$

where A is the proportion, by molecular weight, of indirect electron transition semiconductive material; $E_{ID}$ is the difference in energy between the two band edges of the indirect electron transition material and $E_D$ is the corresponding energy difference in the direct electron transition material; and, X is a number in the range from 0.65 to 0.85. Of course, when the indirect material selected is one of the small energy difference materials, that is frequently denominated a direct transition material for other purposes, as gallium antimonide, the quantity $E_{ID}$ is a negative number. The remainder of the alloy consists essentially of the selected indirect transition semiconductive material. Thus, the direct transition semiconductive material is present in a "weighted proportion" that ensures that the first conduction band edge of the alloy is below the second conduction band edge thereof. The weighting factor is advantageously selected to be near to 0.85 when low magnitudes of hydrostatic pressure are to be measured and the weighting factor approaches 0.65 when the alloy is to be used to measure very high magnitudes of hydrostatic pressure or when substantial temperature compensation is to be achieved as is described presently.

The term "temperature compensation" as used herein and in the appended claims relates to compensation for variation in the rate of change of resistivity with changes in hydrostatic pressure that occurs when the temperature is altered. The rate of change of resistivity with changes in hydrostatic pressure directly affects the sensitivity with which measurements can be made. It is necessary to a complete understanding of the present feature of our invention that the change in bulk resistivity of the semiconductive body with temperature variations not be confused with the variations in rate of change of resistivity, due to pressure changes, with temperature. The present invention pertains to the latter. Compensation for the former phenomenon may be accomplished easily by means well-known in the art, as by controlling the impurity concentrations or by using a bridge measurement wherein two similar semiconductive bodies that are subjected to the same temperature are disposed in opposite arms of a bridge circuit to cancel temperature effects. In the latter measuring technique only one of the two semiconductive bodies is exposed to the force to be measured. In contradistinction to this, the present invention is concerned with the rate of change of resistivity with changes in force or hydrostatic pressure, which can not be temperature compensated effectively by such means.

Substantial temperature compensation is achieved in accord with the present invention by virtue of the discovery illustrated in FIGURE 3, namely, that the pressure coefficient of resistivity versus percentage composition characteristics taken at various temperatures contain a plurality of intersections at alloys having slightly altered constituent percentages from that yielding maximum rate of resistance change with variation in hydrostatic pressure. Thus, substantial temperature compensation is achieved at a slight sacrifice in sensitivity.

In FIGURE 3, characteristic curve 33 is taken at room temperature. Curve 32 is for a substantially reduced temperature and curve 34 represents a substantially increased temperature. By selecting the percentage of constituents corresponding to point 35, the pressure coefficient of resistivity changes only between point 36 on curve 33 and point 37 on curve 34 throughout the wide range of temperatures included between characteristic curves 32 and 34.

In applications where the only temperature variation expected is a change above room temperature the composition may advantageously be selected as that corresponding to point 38, which is at the intersection of the characteristic curves 33 and 34. Conversely, if only temperatures lower than room temperature are expected, the composition corresponding to point 39 may advantageously be selected. Point 39 is the intersection of the characteristic curves corresponding to temperatures 32 and 33. Thus, the alloy semiconductive bodies of the present invention render a significant advantage with respect to temperature compensation that is not found in simple semiconductive compounds, such as gallium antimonide, that exhibit characteristic curves corresponding to only a portion of the right-hand half of FIGURE 3.

While various combinations of the aforementioned indirect and direct transition semiconductive materials, and others of similar band structure, may be used advantageously in accord with the present invention, we prefer to select gallium arsenide as the first semiconductive material and gallium phosphide as the second semiconductive material because of the high degree of mutual solubility of these two compounds. This adds a great degree of flexibility to alloy fabrication, which is highly desirable.

In gallium arsenide, energy difference 6 of FIGURE 1 is equal to approximately 0.35 electron volt and in gallium phosphide the energy difference 11 of FIGURE 2 is approximately equal to 0.4 electron volt. The energy level of the first conduction band, or band gap, of gallium arsenide is about 1.4 electron volts, with respect to the valence band at room temperature. The corresponding energy level, or bandgap, for the second conduction band of gallium phosphide is about 2.2 electron volts. For alloys of gallium arsenide and gallium phosphide, the mobility ratio between the bands remains high, about 30, and is substantially independent of composition. The density of states ratio is approximately 70.

The aforementioned energy ratio for these materials is .35/.75. By weighting the proportion in accord with the limits of the aforementioned range of from 0.65 to 0.85, the suitable range of the indirect material, gallium phosphide, is from about 30 to 40 mole percent with the remainder consisting essentially of gallium arsenide.

The experimentally observed static pressure sensitivity of the composition having approximately 60 mole percent gallium arsenide is greater than $300 \times 10^{-12}$ centimeters$^2$ per dyne. This figure more than favorably compares with silicon, which has one of the largest presently known piezoresistance coefficients, for uniaxial stress, of $138 \times 10^{-12}$ centimeters$^2$ per dyne.

For substantial temperature compensation below room temperature the composition may advantageously be varied to about 65 mole percent gallium arsenide and 35 mole percent gallium phosphide, in accordance with the teaching of FIGURE 3. Also, substantial temperature compensation for temperature variations above room temperature are achieved by a composition constituted of about 68 mole percent gallium arsenide and 32 mole percent gallium phosphide.

It is evident that the permissible range of constituents is greater than is apparent from the graph of FIGURE 3, that is presented for illustration. The reason for this is that characteristic curves 32, 33 and 34 are dependent upon pressure to some extent and undergo simultaneous horizontal translation in response to variations in pressure. In general, translation is to the left, as seen in FIGURE 3, with increasing pressure, requiring increased concentration of the direct transition constituent. Thus, an alloy providing optimum temperature compensation for one pressure range will not be the same, necessarily, as an alloy providing optimum temperature compensation for another pressure range far removed therefrom. FIGURE 4 illustrates the aforementioned phenomenon.

FIGURE 4 is a graph of rate of resistance change versus hydrostatic pressure and is plotted from experimentally determined data using a crystal constituted of 65 mole percent gallium arsenide and 35 mole percent gallium phosphide with tellurium impurity introduced therein to obtain the necessary electron population, wherein the Fermi level is below the conduction bands. Characteristic curves 40, 41 and 42 are plotted for temperatures of 0° C., 25° C. and 87° C., respectively. The rate of resistance change was obtained by measuring the rate of voltage change with a constant current (10 ma.) flowing through the crystal. The pressure coefficient of resistivity, as determined by the slope of curves 40, 41, 42, is about $194 \times 10^{-12}$ centimeters$^2$ per dyne at atmospheric pressure.

The characteristic curves of FIGURE 4 show the substantial temperature compensation achieved, by practice of the present invention, over the wide pressure range from atmospheric pressure to a hydrostatic pressure of more than 2,000 atmospheres. The graph encompasses the ranges of temperature and pressure most often encountered and thus illustrates the preferred embodiment of the present invention with gallium arsenide and gallium phosphide, although other alloy concentrations and compositions can be used advantageously in accordance with the invention, particularly in other environments, as discussed before.

Determination of the alloy composition having a maximum pressure coefficient for low pressures is made to a close approximation with the following general equation:

$$(2) \quad \Delta E = \frac{kT}{2} \ln \frac{b_p{}^2}{b}$$

where:
$k$ is Boltzmann's constant,
$T$ is temperature in ° Kelvin,
$b_p$ is the ratio of the density of states of the second band to that of the first band;
$b$ is the ratio of the mobility of the first band to that of the second band; and,
$\Delta E$ is the amount, in electron volts, by which the energy level of the second band edge of the alloy body exceeds that of the first band edge, at atm. pressure.

Because the constituents contribute to the band gap of the alloy in direct proportion to their respective concentrations and band gaps, the quantity of indirect semiconductive material is readily determined from the value of $\Delta E$ given above. $\Delta E$ provides the "weighting" in place of the aforementioned factor.

Substantial temperature compensation is achieved in the range of a given temperature, $T$, by solving the following equation, wherein the symbols are the same as above, for $\Delta E$:

$$(3) \quad b_p e - \frac{\Delta E}{kT} = \frac{b+1}{2\left(1+\frac{\Delta E}{kT}\right)} \left[ -1 + \sqrt{1 + 4\left[\frac{\left(\frac{\Delta E}{kT}\right)^2 - 1}{b+1}\right]} \right]$$

The molecular proportion of indirect material, A, is obtained from the following equation, once the magnitude of $\Delta E$ is defined from either Equation 2 or 3:

$$(4) \quad A = \frac{E_D - \Delta E}{E_D + E_{ID}}$$

wherein $E_D$ and $E_{ID}$ are defined as in Equation 1.

The alloy crystals of the present invention may be prepared in any of a plurality of means well-known in the art, however, we prefer to form the crystals by the narrow zone technique described in copending U.S. Patent application No. 119,540, filed June 26, 1961, now Patent No. 3,201,227, and assigned to the assignee herein. The technique described therein is particularly desirable when one or both alloy constituents are readily decomposable compounds.

There has been described herein pressure measuring means comprising a semiconductive alloy body constituted of a plurality of semiconductive compounds. The invention has been described primarily in conjunction with hydrostatic pressure measurements because the present contribution enables a new order of precision to be obtained in such measurements. Particularly is this true for high magnitude hydrostatic pressure which, in the past, was measured by resort to manganin wire that only possesses a pressure coefficient of resistivity of $2.4 \times 10^{-12}$ centimeters$^2$ per dyne. The foregoing notwithstanding, however, the instant teaching also offers a significant contribution to the art of force, strain and pressure measurements generally by providing a more pressure and less temperature sensitive semiconductive body for such measurements that additionally may be randomly orientated, rather than carefully aligned with respect to its crystallographic axes and the direction of force, as required in the prior art. Thus, the term force as used in the appended claims is intended to include uniaxial force as well as pressure, the latter being force divided by the area of application.

Figure 5:
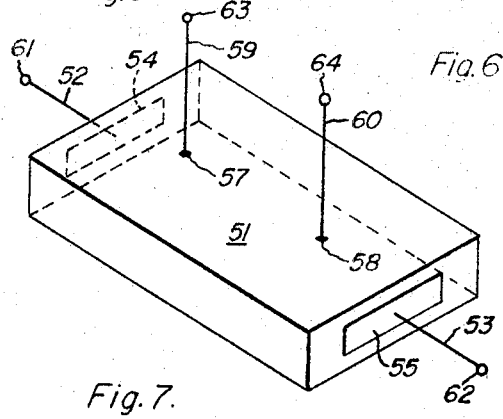
FIGURE 5 illustrates preferred means for effecting electrical connection to the hydrostatic pressure sensor of this invention.

FIGURE 5 is a greatly enlarged view of a block of semiconductive alloy, shown generally as rectangular body 51. Body 51 is advantageously adapted to facilitate measurement of the resistivity thereof by providing a pair of electrical conductors 52 and 53 that are connected to respective opposite ends of body 51. Conductors 52 and 53 can be connected, for example, by soldering to previously deposited or alloyed precious metal contact areas 54 and 55, respectively. Another pair of contacts 57 and 58 are similarly provided and, preferably, are of much smaller size. Contacts 57 and 58 are positioned on one surface of body 51 that is generally perpendicular to the end surfaces to which conductors 52 and 53 are attached. Additionally, contacts 57 and 58 are spaced in the direction of current from contact 54 to contact 55. A pair of conductors 59 and 60 are connected to contacts 57 and 58, respectively, as by soldering thereto. A pair of electrical terminals 61 and 62 are advantageously connected to conductors 52 and 53, respectively, in order to facilitate electrical connection thereto. Similarly, a pair of electrical terminals 63 and 64 are provided for conductors 59 and 60, respectively.

While a great number of techniques can be used advantageously to sense, or measure, the resistance of body 51, the arrangement of FIGURE 5 is preferred because the resistance measurement is made independent of the resistance of contacts 54, 55, 57 and 58. This is accomplished by causing an electric current of predetermined magnitude between terminal 61 and terminal 62. Thereafter, the electric potential appearing between terminals 63 and 64 is used as an indication of the resistance change of the body. Because the present invention is primarily concerned with variations, or changes, in the resistance value, as opposed to the absolute value of resistance, the structure of FIGURE 5 is particularly advantageous.

Figure 6:
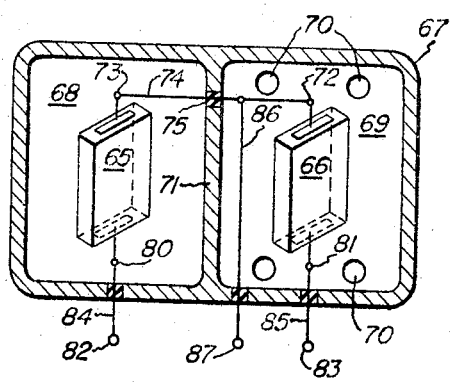
FIGURE 6 is a cross-sectional view of a hydrostatic pressure sensor assembly; and, FIGURE 7 shows a suitable electrical circuit for use with the assembly of FIGURE 6.

FIGURE 6 is a greatly enlarged cross-sectional view of a particular hydrostatic pressure measuring device that is advantageously used in accord with the present invention, although the invention is in no way limited thereto. The device includes two similar semiconductive bodies 65 and 66, each substantially as set forth before in conjunction with body 51 of FIGURE 5, however, only end electrical contacts are illustrated in FIGURE 6.

Semiconductive alloy bodies 65 and 66 are enclosed within a walled housing 67 having a first enclosure 68 that is sealed from external hydrostatic pressure and an enclosure 69 that is vented to external hydrostatic pressure by a plurality of vent holes 70. Body 65 is sealed within enclosure 68 and body 66 is positioned within vented enclosure 69. The enclosures are separated or divided by a suitable partitioning wall 71. One current terminal 72 of body 66 is connected to one current terminal 73 of body 65 by a conductor 74 passing through a suitable opening 75 in wall 71. Opening 75 is suitably sealed about conductor 74 during the final manufacture of the device. The exact sealing technique depends upon the order of magnitude of the hydrostatic pressure to be sensed as well as the intended temperature of operation. Fused quartz, for example, provides a suitable sealant for a wide variety of applications.

The remaining current terminals 80 and 81 of bodies 65 and 66, respectively, are electrically connected externally of housing 67 to corresponding external terminals 82 and 83 by conductors 84 and 85, respectively. Conductor 86 electrically connects both of current terminals 72 and 73 to external terminal 87. Conductor 84 is suitably sealed to the wall of enclosure 67 at its point of transit therethrough, in order to ensure no leakage of the external medium, of which the hydrostatic pressure is to be sensed, into sealed chamber 68. Similar seals can be provided for conductors 85 and 87 for mechanical purposes, if desired.

Examination of the device of FIGURE 6 reveals that the current terminals of bodies 65 and 66 are connected in series between external terminals 82 and 83. Thus, a similar magnitude of current is caused to flow in both bodies by suitable connection of terminals 82 and 83 to a source of electric current. Of course, the two bodies can be connected in parallel circuit relationship to suit a particular application. At a predetermined temperature and hydrostatic pressure the voltages between terminal 87 and terminals 82 or 83 will be equal but of opposite polarity. Variations in temperature of both bodies still yields no difference in absolute magnitude between the two voltages. However, when the device of FIGURE 6 is subjected to a change in hydrostatic pressure, the resistivity of body 66 changes while the resistivity of isolated body 65 remains as before. Thus, a difference between the two voltages occurs. As discussed before, measurement of this potential difference, that can be converted readily to a variation in resistance of body 66, provides an indication of the magnitude of hydrostatic pressure change.

While the hydrostatic pressure sensing device of FIGURE 6 is adapted as described to measure the hydrostatic pressure of most mediums, in the event that the medium is highly conductive, body 66 and the various conductors within chamber 69 are advantageously coated with any of a plurality of well-known insulating substances. Of course, the insulating coating for body 66 must remain sufficiently flexible to transmit hydrostatic pressure variations directly thereto.

Figure 7:
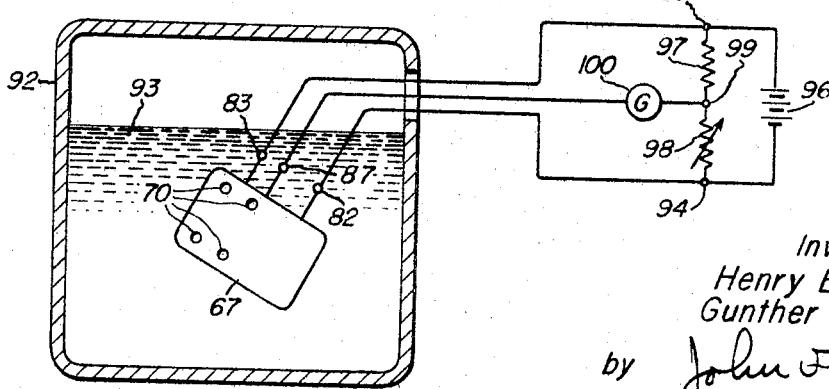

FIGURE 7 illustrates a specific electric circuit arrangement that can be used with the device of FIGURE 6 to provide measurement of hydrostatic pressure. The hydrostatic pressure measuring device is shown enclosed within a container 92 that encloses any given medium 93 where it is desired to measure hydrostatic pressure. Terminals 82 and 83 are connected to output terminals 94 and 95 of a suitable current source 96 that can comprise a battery as shown schematically, the plate circuit of a pentode vacuum electron discharge device, or the collector circuit of a transistor. A constant current supplied to terminals 82 and 83 is preferred in order to remove an unnecessary variable from the determination of rate of resistance change of body 66, as seen in FIGURE 6.

A fixed resistor 97 and a variable resistor 98 are connected in series circuit relationship across terminals 94 and 95 and their junction 99 is connected through a suitable current indicator 100, that can be a galvanometer, to terminal 87.

In operation, variable resistor 98 is adjusted until current indicating instrument 100 "nulls," or indicates that there is no current between terminals 90 and 91. By previous calibration, or subsequent determination, the resistance value of resistor 98 yields the voltage unbalance between the potentials appearing in the two semiconductive bodies. Since the magnitude of current is maintained constant, the voltage unbalance is proportional to the resistance unbalance. Thus, the change in resistivity is determined and, as described before, an indication of the magnitude of variation of hydrostatic pressure is determined. Of course, there are a great number of equivalent null-balance measuring techniques that can be used to equal advantage.

Thus, there has been shown and described herein by way of specific examples hydrostatic pressure measuring devices fabricated from semiconductive material alloys. The alloys can include two or more semiconductive materials as long as one is of the direct transition type and another is of the indirect transition type.

In applications wherein temperature variations are not excessive, or wherein the temperature variations are not excessive, or wherein the temperature variations are known, a device of the type generally shown in FIGURE 5 is used advantageously. In more severe applications, the hydrostatic pressure measuring device of the type shown in FIGURE 6 is employed. With either, it is preferable to use the constant current source and null-balance voltage sensing arrangement detailed in FIGURE 7, although such means for detecting variations in resistance are not required and other suitable electrical connections can be used.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What we claim as new and desire to secure by Letters Patent of the United States is:

1. A hydrostatic pressure sensor comprising: a body constituted essentially of a direct electron transition semiconductive material and an indirect electron transition semiconductive material, said materials being present in said body in predetermined relative concentrations by molecular weight that cause said body to exhibit first and second conduction band edges having substantially equal energy levels; and, means responsive to variations in the electrical resistivity of said body to provide an indication of changes in hydrostatic pressure exerted on said body independent of the orientation of said body.

2. A hydrostatic pressure sensor comprising: a complex compound semiconductive crystalline body constituted essentially of an indirect electron transition semiconductive material and a direct electron transition semiconductive material, each of said materials exhibiting first and second conduction bands wherein the electron mobility in the first band is substantially higher than in the second band, the first and second conduction band edges of said indirect electron transition semiconductive material being separated at atmospheric pressure by a predetermined energy difference, $E_{ID}$, and the first and second conduction band edges of said direct electron transition semiconductive material being separated at atmospheric pressure by a predetermined energy difference, $E_D$, said indirect electron transition semiconductive material being present in said body in a proportion by molecular weight, A, defined by the relationship;

$$A = \frac{E_D}{E_{ID} + E_D} \quad (X)$$

where X is a number in the range from 0.65 to 0.85; and, means electrically connected to said body and responsive to variations in the electrical resistivity of said body to provide an indication of changes in hydrostatic pressure exerted on said body independent of the orientation of said body.

3. A hydrostatic pressure sensor comprising: an inorganic complex compound crystalline semiconductive body exhibiting first and second conduction bands, the edge of said first conduction band being at a lower energy level than the edge of said second conduction band and differing therefrom by an energy difference, $\Delta E$, defined by the relationship;

$$\Delta E = \frac{kT}{2} \ln \frac{b_\rho^2}{b}$$

where:

$k$ is Boltzmann's constant,
T is the operating temperature in °K.,
$b_\rho$ is the ratio of the density of states of said second band to that of said first band, and,
$b$ is the ratio of the electron mobility of said first band to that of said second band and, means responsive to variations in the electrical resistivity of said body to provide an indication of changes in hydrostatic pressure exerted on said body independent of the orientation of said body.

4. The hydrostatic pressure sensor of claim 3 wherein said body is constituted essentially of a direct electron transition semiconductive material having first and second conduction bands with respective edges separated by an energy difference, $E_D$, and an indirect electron transition semiconductive material having first and second conduction bands with respective edges separated by an energy difference, $E_{ID}$, and said indirect electron transition semiconductive material is present in said body in a proportion by molecular weight, A, defined by the relationship, $$A = \frac{E_D - \Delta E}{E_D + E_{ID}}$$

5. A hydrostatic pressure sensor comprising: a complex compound crystalline semiconductive body, said body exhibiting first and second conduction bands with the edge of the first band being less in energy than the edge of the second band by an energy difference, $\Delta E$, defined by the relationship.

$$b_\rho e^{-\frac{\Delta E}{kT}} = \frac{b+1}{2\left(1+\frac{\Delta E}{kT}\right)} \left[ -1 + \sqrt{1 + 4\left[\frac{\left(\frac{\Delta E}{kT}\right)^2 - 1}{b+1}\right]} \right]$$

where:

$k$ is Boltzmann's constant,
T is the operating temperature in °K.,
$b_\rho$ is the ratio of the density of states of said second band to that of said first band, and
$b$ is the ratio of the electron mobility of said first band to that of said second band and, means responsive to variations in the electrical resistivity of said body to provide an indication of changes in hydrostatic pressure exerted on said body independent of the orientation of said body.

6. The hydrostatic pressure sensor of claim 5 wherein said body is constituted essentially of a direct electron transition semiconductive material having first and second conduction bands with respective edges separated by an energy difference, $E_D$, and an indirect electron transition semiconductive material having first and second conduction bands with respective edges separated by an energy difference, $E_{ID}$, and said indirect electron transition semiconductive material is present in said body in a proportion by molecular weight, A, defined by the relationship, $$A = \frac{E_D - \Delta E}{E_D + E_{ID}}$$

7. The method for measuring force, which method comprises: providing an alloy semiconductive crystal body constituted of a plurality of semiconductive materials, at least one of said materials being of the direct electron transition type and at least one of said materials being of the indirect electron transition type, said ones of said materials each having first and second conduction bands, said first conduction bands exhibiting a higher electron mobility than the second conduction bands thereof, said semiconductive materials being present in said alloy in concentrations which provide first and second conduction bands of substantially equal minimum energy levels in said alloy; positioning said body so as to be subjected to the force to be measured; and, measuring the bulk resistivity of said body to provide an indication of the magnitude of said force.

8. The method of claim 7 wherein said ones of said materials are gallium arsenide and gallium phosphide, respectively.

9. The method of claim 7 wherein said semiconductive crystal body is constituted essentially of gallium arsenide and gallium phosphide.

10. The method of claim 9 wherein said gallium arsenide is present within said body in a concentration in the range from 60 percent to 70 percent by molecular weight.

11. The method of claim 7 wherein the crystallographic axes of said alloy semiconductive crystal body are randomly oriented with respect to said force.

12. The method for measuring hydrostatic pressure of a medium, which method comprises: providing an inorganic alloy semiconductive crystal body, said body being constituted esesntially of first and second semiconductive materials, the first conduction band of said first semiconductive material having a substantially higher electron mobility and a substantially lower minimum energy level than the second conduction band thereof, the first conduction band of said second semiconductive material having a substantially higher electron mobility and a substantially higher minimum energy level than the second conduction band thereof, said first and second semiconductive materials being present in said body in concentrations that provide first and second conduction bands of substantially equal minimum energy levels in said alloy semiconductive crystal body; positioning said body within said medium, and measuring the bulk resistivity of said semiconductive body.

13. The method of claim 11 wherein said first and second semiconductive materials are gallium arsenide and gallium phosphide, respectively.

14. The method of claim 11 wherein the concentration of said gallium arsenide in said body is from 35 percent to 65 percent by molecular weight.

15. A hydrostatic pressure sensor comprising an inorganic complex compound semiconductive body constituted of at least three elemental constituents; a first pair of said constituents being capable of combining in first predetermined percentage concentrations by molecular weight to provide the essential elements of an indirect electron transition semiconductive compound having two conduction bands with a predetermined first energy difference between bands; a second pair of said constituents being capable of combining in second predetermined percentage concentrations by molecular weight to provide the essential elements of a direct electron transition semiconductive compound having two conduction bands with a predetermined second energy difference between bands; said first pair of constituents being present in said complex compound in respective percentage concentrations substantially equal to the product of a number in the range from 0.65 to 0.85 mulitplied by the product of said first predetermined percentage and the ratio of said second predetermined energy difference to the sum of said first and second predetermined energy differences; and means electrically connected to said complex compound semiconductive body and arranged to sense the electrical resistivity of said body, said means being responsive to variations in the resistivity of said body to provide an indication of changes in hydrostatic pressure surrounding said body independent of the orientation of said body.

16. The method for measuring the hydrostatic pressure of a medium, which method comprises:
(a) providing an inorganic semiconductive crystal body having first and second conduction bands, said conduction bands having substantially equal minimum energy levels at atmospheric pressure and said first conduction band having a substantially higher electron mobility than said second conduction band, said semiconductive body being constituted essentially of first and second semiconductive materials each having first and second conduction bands, the first conduction band of said first semiconductive material having a substantially higher electron mobility and a substantially higher minimum energy level than the second conduction band thereof, and the first conduction band of said second semiconductive material having a substantially higher electron mobility and a substantially lower minimum energy level than the second conduction band thereof;
(b) positioning said semiconductive body within said medium; and,
(c) measuring the bulk resistivity of said semiconductive body.

References Cited by the Examiner
UNITED STATES PATENTS

| | | | |
|---|---|---|---|
| 2,940,941 | 6/1960 | Dalton | 252—512 |
| 3,079,576 | 2/1963 | Kooiman | 338—4 |
| 3,088,323 | 5/1963 | Welkowitz et al. | 73—398 |
| 3,110,685 | 11/1963 | Offergeld | 252—512 |
| 3,204,463 | 9/1965 | Taber | 73—398 |

FOREIGN PATENTS 782,774   9/1957   Great Britain.

LOUIS R. PRINCE, *Primary Examiner.*

D. O. WOODIEL, *Assistant Examiner.*